United States Patent [19]

Richter

[11] Patent Number: 4,920,907

[45] Date of Patent: May 1, 1990

[54] BOAT DOCK BUMPER

[75] Inventor: Karl E. Richter, Muskego, Wis.

[73] Assignee: Fulton Manufacturing Corporation, West Allis, Wis.

[21] Appl. No.: 284,041

[22] Filed: Dec. 14, 1988

[51] Int. Cl.$^5$ ............................................ B63B 59/02
[52] U.S. Cl. ................................... 114/219; 405/212
[58] Field of Search ................ 114/219; 405/212, 215; 267/139, 140, 140.1 R; 411/399

[56] References Cited

U.S. PATENT DOCUMENTS

| | | | |
|---|---|---|---|
| D. 215,371 | 9/1969 | Peacock | D12/168 |
| D. 235,986 | 7/1975 | Nielsen | D12/168 |
| D. 297,627 | 9/1986 | Patton | D12/168 |
| 2,027,800 | 1/1936 | Whitlock | 405/215 |
| 2,903,990 | 9/1959 | Brown | 114/219 |
| 3,014,710 | 12/1961 | Layne | 267/140 |
| 3,183,875 | 5/1965 | Russell | 114/219 |
| 3,292,566 | 12/1966 | Russell | 114/219 |
| 3,383,870 | 5/1968 | Costello | 405/212 |
| 3,593,531 | 7/1971 | Saadeh | 405/212 |
| 3,620,119 | 11/1971 | King, Jr. et al. | 411/399 |
| 3,721,433 | 3/1973 | Sobel | 267/140 |
| 3,741,598 | 6/1973 | Novak et al. | 267/140 X |
| 3,773,007 | 11/1973 | Haisch | 114/219 |
| 3,773,008 | 11/1973 | Guienne | 114/219 |
| 3,828,715 | 8/1974 | Matsushita | 405/212 X |
| 3,837,695 | 9/1974 | Haase et al. | 267/140 X |
| 3,902,748 | 9/1975 | Bank et al. | 114/219 X |
| 3,950,953 | 4/1976 | Matthews | 405/215 |
| 3,988,997 | 11/1976 | Fenton | 114/219 |
| 4,296,705 | 10/1981 | Uruta et al. | 405/212 X |

FOREIGN PATENT DOCUMENTS 4441  1/1980  Japan .................................. 405/215

Primary Examiner—Sherman D. Basinger
Attorney, Agent, or Firm—Edgar A. Zarins; Malcolm L. Sutherland

[57] ABSTRACT

A damage preventing bumper attachable to fixed marine structures to cushion boats and the like against engagement with the structure. The bumpers are air filled to absorb the shocks of a boat engaging the marine dock or post and include a valve for adjustment of the air quantity. The bumpers are fixedly secured to the marine structure by screws which pass through a sleeve formed through the bumper body. The bumpers are formed in a plurality of configurations to cover the critical areas of the structure including corners and posts. A groove formed in the top of the bumper allows the user to lay marine utility lines such as electrical cords and hoses within the bumper and therefore off of the docking facility. The bumpers are made of a marine grade vinyl for durability and to prevent marring of the boat.

15 Claims, 1 Drawing Sheet

U.S. Patent
May 1, 1990
4,920,907
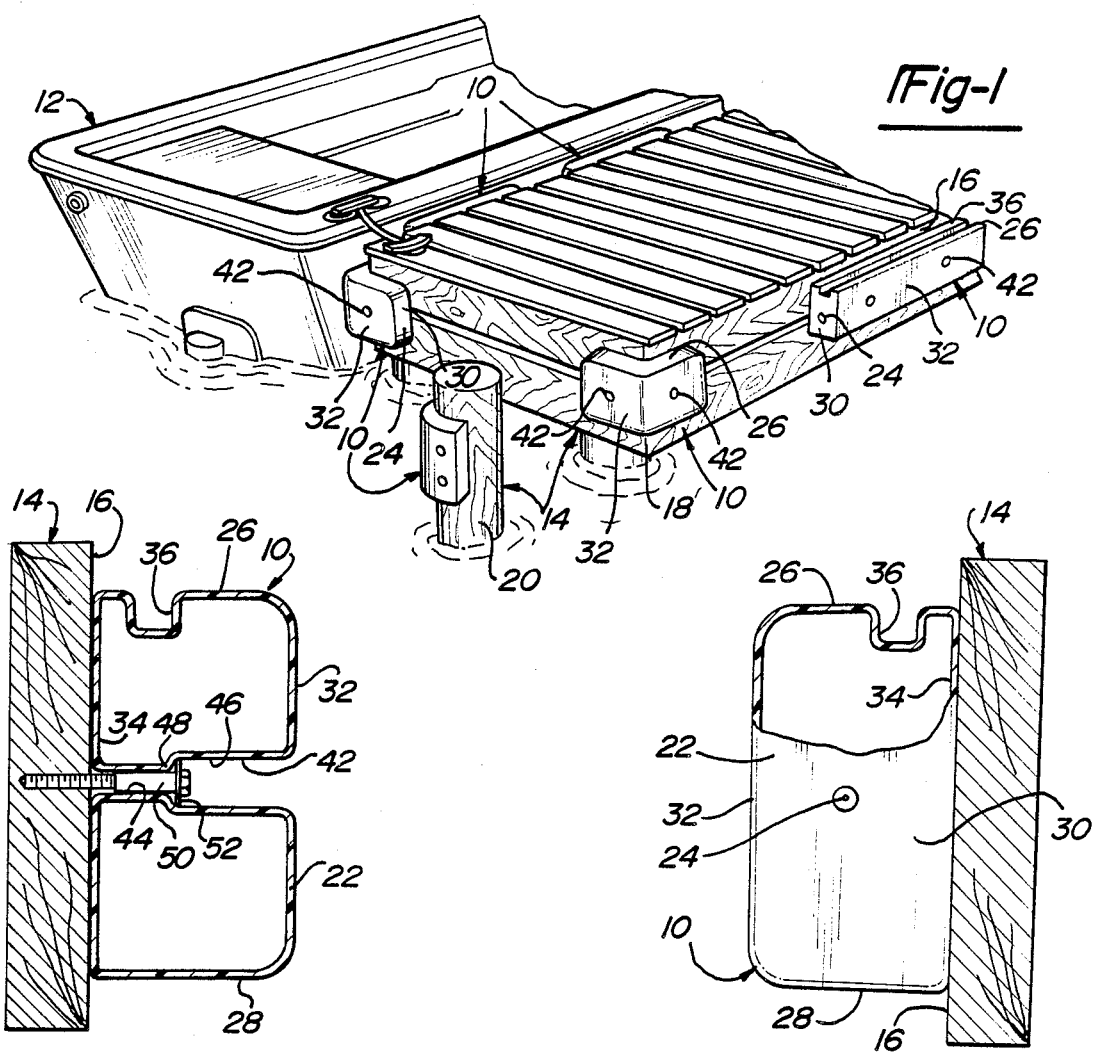
Fig-1
Fig-2
Fig-3
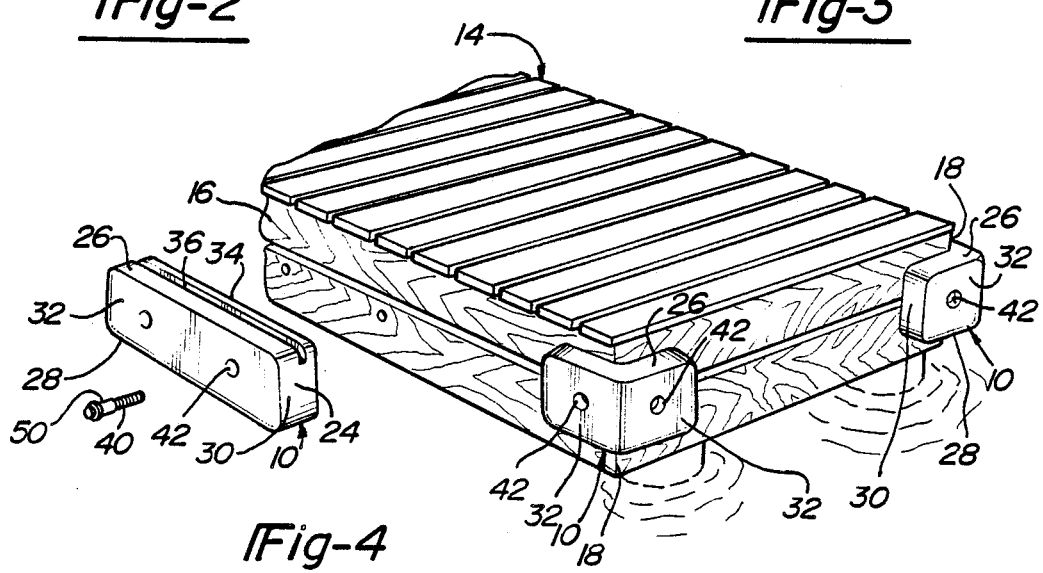
Fig-4

BOAT DOCK BUMPER

BACKGROUND OF THE INVENTION

I. Field of the Invention

This invention relates to a dock bumper attachable to various portions of a dock to prevent a boat from contacting the dock structure and, in particular, to an air-filled bumper securable to a dock including means for receiving marine lines.

II. Description of the Prior Art

Because of the unstable nature of boats, particularly in rough waters, and the fixed structures to which such boats are normally docked, costly damage to the body or hull of the boat can occur without adequate protection. Even when the boats are securely tied to the docking facility, the wake from passing boats and waves due to weather can cause a docked boat to be repeatedly thrown against the docking facility. Since most docks are securely constructed of steel, concrete and wood to withstand the constant pounding of the water and the boats are subject to the movement of the water, the fiberglass material of most modern boats will be easily damaged by direct contact with the dock.

In an attempt to protect the boats, various covering materials are applied to the docking facilities to prevent contact between the boat and fixed structure. Simple and inexpensive materials such as spare tires and carpeting have been utilized although they require frequent replacement and can mar the boat surface. More sophisticated cushions have been developed from foam rubber or vinyl which secure directly to the dock structure. Still others may be filled with air or water prior to being mounted to the dock for added cushioning. However, these cushions can lose their resilient medium requiring removal and/or replacement. Furthermore, all of the past known dock cushions serve no other function than to keep the boat from engaging the docking facility.

SUMMARY OF THE PRESENT INVENTION

The present invention overcomes the disadvantages of the previously known dock cushions by providing an inflatable bumper which can be simply secured to the docking structure. The bumper is provided in several configurations to facilitate attachment to various portions of the dock and may include a groove for receiving utility lines utilized with the boat during docking.

The boat dock bumper according to the present invention includes an elastic body which is configured to conform to a specific portion of the docking facility, the elastic body forming a chamber adapted to be filled with air. The body including a valve formed in the side wall thereof such that the bumper can be reinflated even while secured to the dock. The bumper body includes at least one tubular opening through the chamber and sealingly formed with the body to receive the fastening bolts for the bumper. The mounting hardware is positioned within the opening to prevent contact with the boat even under compression. A groove formed in the top surface of the bumper allows the boater to keep utility lines such as electrical cords and water hoses off of the docking surface.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which:

FIG. 1 is an elevated perspective view of a boat secured to a docking facility having different configurations of the boat dock bumpers embodying the present invention secured thereto;

FIG. 2 is a cross-sectional view of a boat dock bumper of the present invention;

FIG. 3 is a partial cross-sectional perspective of a boat dock bumper secured to the docking facility; and FIG. 4 is an elevated perspective of a docking facility showing the dock bumper of the present invention secured thereto.

DETAILED DESCRIPTION OF A PREFERRED EMBODIMENT OF THE PRESENT INVENTION

Referring first to FIG. 1, there is shown a boat dock bumper 10 embodying the present invention for preventing contact between a boat 12 and a docking structure 14. The docking structure 14 may be in the form of a platform to facilitate entry and exit from the boat 12 or a pier piling for simply tying down the boat 23. Because of the swaying movement of the boat 12 caused by the water, the boat 12 may be continuously driven into the docking structure 14. The bumper 10 of the present invention cushions the docking structure 12 to prevent contact and possible damage. In order to provide complete protection against contact, the boat dock bumper 10 may be manufactured in several different shapes for mounting to the different structures 14. As shown in FIGS. 1 & 4, the boat dock bumper 10 may have a substantially rectangular configuration for mounting to a planar surface 16 of the docking structure 14, an angular configuration for mounting to a corner 18 of the docking structure 14, or a semi-cylindrical configuration for mounting to a pier piling 20. More than one semi-cylindrical bumper 10 can be mounted to the piling 20 to substantially encircle the structure. Of course, still other configurations may be developed for mounting to irregular docking structures 14.

Referring now to FIGS. 2 and 3, the boat dock bumper 10 generally comprises an inflatable body 22 made of a marine vinyl for durability and reduced maintenance and which will not mar the boat structure 12. The vinyl material provides flexibility to facilitate inflation while also providing resiliency to withstand the shocks associated with docking facilities. Because of the extreme shocks which the inflated bumper 10 will be subjected, the body 22 is integrally formed with little or no seams which are the first to fail under such applications. The body 22 includes a valve 24 to inflate the body 22 or to vary the volume of air within the bumper 10 thereby varying the resiliency of the bumper 10. The valve 24 may be in the form of a simple check valve such as the type used in vehicle tires. Preferably, the valve 24 is formed in one of the side walls of the body 22 to allow access even when the bumper 10 is mounted to the docking facility 14 yet prevent contact between the boat 12 and valve 24 which can scratch the boat finish.

The body 22 of the boat dock bumper 10 has a substantially rectangular cross-sectional configuration with top surface 26, bottom surface 28, and side surfaces 30 disposed perpendicular to the docking facility 14 and outer load-bearing surface 32 and inner surface 34 disposed parallel to the docking facility 14. In one embodiment of the present invention, the top surface 26 includes an elongated groove 36 extending parallel to the docking facility 14. The groove 36 is open at both ends and extends substantially the length of the top surface 26 of the bumper 10. The groove 36 provides means for retaining the utility lines associated with many boats 12 including power cords and water hoses. By placing the utility lines within the boat dock bumper 10, they are prevented from hanging in the water while also removing them from the dock platform where they can cause a person to trip and possibly fall into the water.

As shown in FIGS. 2 and 4, the boat dock bumper 10 is fastened to the docking structure 14 using a fastener 40 such as lag screws, bolts, rivets, etc. which extend through the body 22. Different fastening means will be necessary to secure the bumper 10 to docking facilities made of metal or concrete. The body 22 includes a tubular sleeve 42 forming an integral part of the body 22 thereby forming at least one passage extending entirely through the bumper 10. In this manner, the fasteners 40 are used to secure the center portion of the bumper 10. Moreover, contact between the fastener and the boat 10 is prevented since the fasteners 40 are protectively surrounded by the body 22. The tubular sleeve 42 forming the passage preferably includes two portions, an innermost portion 44 and a larger diameter outermost position 46 which acts as a countersink to receive the end of the fastener 40. An annular shoulder 48 formed therebetween limits the distance the fastener 40 can travel through the passage 42. In a preferred embodiment, the fastener 40 is provided with a retaining sleeve 50 having an annular flange 52 which seats against the shoulder 48.

Thus, the present invention provides a simple and convenient device for preventing contact between a boat 12 and docking facility 14. The bumper 10 of the present invention provides an air-filled cushion for shock absorbing resiliency and means for retaining the utility lines of the boat 12 during docking. The construction of the bumper 10 provides easy mounting to the docking facility 14 while insulating the mounting hardware against contact with the boat surface. The valve used to regulate the amount of air in the boat dock bumper 10 is easily accessible even one mounted without the threat of marring or scratching the boat surface.

The foregoing detailed description has been given for clearness of understanding only and no unnecessary limitations should be understood therefrom as some modifications will be obvious to those skilled in the art without departing from the scope and spirit of the appended claims.

I claim:

1. A boat dock bumper securable to a peripheral surface of a docking structure for preventing contact between a marine vessel and the docking structure, said boat dock bumper comprising:
    an inflatable body having valve means to vary the volume of fluid within said body;
    at least one passage formed through said body for receiving fastening means to secure said body to the docking structure, said at least one passage formed by a tubular sleeve integrally and sealingly formed with said body such that said fastening means extends through said at least one passage while inflation of said body is maintained, said at least one passage including a first diameter portion and a second reduced diameter portion forming an annular shoulder therebetween whereby said fastening means is received within said second reduced diameter portion and said annular shoulder prevents a flanged head member of said fastening means from extending into said second reduced diameter portion, said first diameter portion receiving said head member of said fastening means; and
    an elongated groove formed in a top surface of said body for receiving utility lines of the boat, said groove extending the length of said body and open at both ends, said groove formed substantially parallel and spaced apart from the docking surface.

2. The boat dock bumper as defined in claim 1 wherein said body has an outer loading bearing surface and an inner engagement surface, said outer and inner surfaces formed substantially parallel to the docking structure surface to which said bumper is attached, said at least one passage formed through said body perpendicular to said outer and inner surfaces.

3. The boat dock bumper as defined in claim 2 wherein said body has a substantially rectangular configuration with said top surface, a bottom surface, and side surfaces formed substantially perpendicular to the docking surface.

4. The boat dock bumper as defined in claim 2 wherein said body has a substantially semi-cylindrical configuration with said inner and outer surfaces having a predetermined curvature such that said bumper can be secured to a cylindrical docking structure, said top surface, a bottom surface and side surfaces formed substantially perpendicular to the docking surface.

5. The boat dock bumper as defined in claim 2 wherein said body has a substantially angular configuration with said inner and outer surfaces having a predetermined angle such that said bumper can be secured to a corner of the docking structure, said top surface, a bottom surface and side surfaces formed substantially perpendicular to the docking surface.

6. The boat dock bumper as defined in claim 2 wherein said fastening means comprises a lag screw and retaining sleeve, said retaining sleeve seating against said annular shoulder to limit extension of said fastening means through said at least one passage.

7. The boat dock bumper as defined in claim 1 wherein said valve means is formed in a side surface of said body for access from the docking structure without removal of said bumper.

8. An improved boat dock bumper securable to a peripheral surface of a docking structure for preventing contact between a boat and the docking structure, the improvement comprising:
    an inflatable body with valve means for varying the fluid volume within said body, said body having an outer load-bearing surface and an inner abutment surface formed substantially parallel to the docking surface and including at least one passage formed through said body perpendicular to said inner and outer surfaces;
    fastening means for securing said body to the structure, said fastening means received within said at least one passage to extend through said body;
    said at least one throughpassage formed by a tubular sleeve integrally and sealingly formed with said body such that said fastening means can pass through said body while inflation of said body is maintained, said at least one throughpassage having a first diameter portion and a second reduced diameter portion with an annular shoulder therebetween said annular shoulder formed substantially parallel to and intermediate said inner and outer body surfaces to limit extension of said fastening means through said at least one passage; and an elongated groove formed in a top surface of said body to receive utility lines of the boat, said groove formed substantially parallel to said inner and outer surfaces of said body and extending between side surfaces such that said groove is open at both ends.

9. The improved boat dock bumper as defined in claim 8 wherein said fastening means comprises a lag screw and retaining sleeve, said retaining sleeve seating against said annular shoulder to limit extension of said fastening means through said at least one passage.

10. An improved boat dock bumper securable to a peripheral surface of a substantially cylindrical docking structure for preventing contact between a boat and the docking structure, the improvement comprising:

an inflatable body with valve means for varying the fluid volume within said body, said body having an outer load-bearing surface and an inner abutment surface, said inner and outer surfaces having a curvature substantially equal to the curvature of the cylindrical docking structure such that said inner and outer surfaces are parallel to the docking surface over the entire surface area of said inner and outer surfaces, said body including at least one passage therethrough perpendicular to said inner and outer surfaces; and fastening means for securing said body to the structure, said fastening means received within said at least one passage to extend through said body;

said at least one throughpassage formed by a tubular sleeve integrally and sealingly formed with said body such that said fastening means can pass through said body while inflation of said body is maintained, said at least one passage having a first diameter portion and a second reduced diameter portion with an annular shoulder therebetween, said annular shoulder formed substantially parallel to and intermediate said inner and outer body surfaces to limit extension of said fastening means through said at least one passage.

11. The improved boat dock bumper as defined in claim 10 wherein said fastening means comprises a lag screw and retaining sleeve, said retaining sleeve seating against said annular shoulder to limit extension of said fastening means through said at least one passage.

12. The improved boat dock bumper as defined in claim 10 and further comprising an elongated groove formed in a top surface of said body to receive utility lines of the boat, said groove formed substantially parallel to said inner and outer surfaces of said body and extending between side surfaces such that said groove is open at both ends.

13. An improved boat dock bumper securable to a corner surface of a docking structure for preventing contact between a boat and the docking structure, the improvement comprising:

an inflatable body with valve means for varying the fluid volume within said body, said body having an outer load-bearing surface and an inner abutment surface, said inner and outer surfaces each having two perpendicular portions to facilitate securement to the corner surface, said body including at least one passage through each portion perpendicular to said inner and outer surfaces; and fastening means for securing said body to the structure, said fastening means received within said at least one passage to extend through said body;

said at least one throughpassage formed by a tubular sleeve integrally and sealingly formed with said body such that said fastening means can pass through said body while inflation of said body is maintained, said at least one passage having a first diameter portion and a second reduced diameter portion with an annular shoulder therebetween, said annular shoulder formed substantially parallel to and intermediate said inner and outer body surfaces to limit extension of said fastening means through said at least one passage.

14. The improved boat dock bumper as defined in claim 13 wherein said fastening means comprises a lag screw and retaining sleeve, said retaining sleeve seating against said annular shoulder to limit extension of said fastening means through said at least one passage.

15. The improved boat dock bumper as defined in claim 11 and further comprising an elongated groove formed in a top surface of said body to receive utility lines of the boat, said groove formed substantially parallel to both portions of said inner and outer surfaces of said body and extending between end surfaces of said body such that said groove is open at both ends.

* * * * *